(12) United States Patent
Ha et al.

(10) Patent No.: US 8,569,996 B2
(45) Date of Patent: Oct. 29, 2013

(54) POWER MANAGEMENT CIRCUIT TO MANAGE DISTRIBUTION OF RECEIVED POWER AND A PORTABLE APPARATUS HAVING THE SAME

(75) Inventors: Jung-Woo Ha, Goyang-si (KR); Ho-Jung Ju, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 722 days.

(21) Appl. No.: 12/722,234

(22) Filed: Mar. 11, 2010

(65) Prior Publication Data

US 2010/0231179 A1    Sep. 16, 2010

(30) Foreign Application Priority Data

Mar. 12, 2009    (KR) .................. 10-2009-0021334

(51) Int. Cl.
*H02J 7/00*    (2006.01)
(52) U.S. Cl.
USPC ............................. 320/124; 320/128; 320/164
(58) Field of Classification Search
USPC .................................................. 320/124–128
See application file for complete search history.

(56) References Cited

U.S. PATENT DOCUMENTS

| | | | |
|---|---|---|---|
| 5,963,015 A * | 10/1999 | Lee ................................ | 320/128 |
| 2004/0164708 A1 | 8/2004 | Veselic et al. | |
| 2004/0227487 A1* | 11/2004 | Xiong et al. .................. | 320/116 |
| 2006/0181241 A1* | 8/2006 | Veselic ......................... | 320/107 |
| 2006/0187689 A1* | 8/2006 | Hartular ........................ | 363/63 |
| 2006/0209578 A1* | 9/2006 | Takeshita et al. .............. | 363/63 |

FOREIGN PATENT DOCUMENTS

| | | |
|---|---|---|
| JP | 2005-012889 | 1/2005 |
| JP | 2007-060778 | 3/2007 |
| JP | 2008-211966 | 9/2008 |
| KR | 1020050109499 | 11/2005 |

* cited by examiner

*Primary Examiner* — Samuel Berhanu
(74) *Attorney, Agent, or Firm* — F. Chau & Associates, LLC

(57) ABSTRACT

A portable apparatus includes a system configured to receive a system current and perform a function, a charging battery configured to be charged with a charging battery current and supply power to the system, and a power management circuit configured to receive an externally supplied power, supply the system current to the system, and supply the charging battery current to the charging battery based on a sensed level of the system current, wherein the charging battery current decreases in proportion to the system current.

11 Claims, 2 Drawing Sheets

POWER MANAGEMENT CIRCUIT TO MANAGE DISTRIBUTION OF RECEIVED POWER AND A PORTABLE APPARATUS HAVING THE SAME

CROSS-REFERENCE TO RELATED APPLICATION

This application claims priority under 35 U.S.C. §119 to Korean Patent Application No. 10-2009-0021334, filed on Mar. 12, 2009, the disclosure of which is incorporated by reference in its entirety herein.

BACKGROUND

1. Technical Field

Exemplary embodiments of the inventive concept relate to a power management circuit to manage distribution of received power and a portable apparatus having the same.

2. Discussion of Related Art

Portable apparatuses include systems such as mobile communication terminals, MP3 players, and portable multimedia players (PMPs). A portable apparatus may be interconnected to a host device (e.g., a computer) using a universal serial bus (USB) port.

A USB is a connection standard for peripheral devices, which enables a peripheral device (e.g., a portable apparatus) to exchange data with a host device (e.g., a computer) at a high speed. The standard enables the host device to automatically recognize a connection between the peripheral device and the host device when power is supplied to the host device. Further, the USB standard may be used to supply a powering current from the host device to an attached peripheral device. For example, current of about 500 mA may be supplied to a peripheral device when a USB standard having a normal specification is used and a current of about 100 mA may be supplied to the peripheral device when a USB standard having a low-power specification is used.

A portable apparatus may be powered through a USB connection to a host device. The portable device may also be supplied with power using an internal rechargeable battery. However, the power requirements of the portable apparatus may vary based on what functions are being provided and the charge on the rechargeable battery may vary based on use and the life of the battery.

Thus, there is a need for a power management circuit that can efficiently manage the distribution of power to the portable apparatus and its rechargeable battery, and a portable apparatus having the power management circuit.

SUMMARY

A portable apparatus according to an exemplary embodiment of the inventive concept includes a system, a charging battery, and a power management circuit. The system receives a system current and performs a function. The charging battery is charged with a charging battery current and supplies power to the system. The power management circuit receives an externally supplied power, supplies the system current to the system, and supplies the charging battery current to the charging battery based on sensing a level of the system current, wherein the charging battery current decreases in proportion to the system current.

The portable apparatus may include a USB port to receive the externally supplied power. The power management circuit may supply the charging battery current by using the externally supplied power directly.

The power management circuit may include a system power supply and a charging battery power supply. The system power supply may directly receive the externally supplied power, supply the system current to the system, and output a proportional current that increases in proportion to the system current. The charging battery power supply may directly receive the externally supplied power, and supply the charging battery current to the charging battery, which decreases in proportion to the proportional current.

The power management circuit may further include: an input terminal to which the externally supplied power is applied, a system output terminal connected to the system and through which the system current is output, a sensing terminal connected to a sensing resistor and through which the proportional current is output, and a charging battery output terminal connected to the charging battery and through which the charging battery current is output.

The system power supply may include a first controller and a first current mirror unit. The first controller may maintain a voltage of the system output terminal at a first voltage level in response to a reference voltage. The first controller may output a first signal in response to the reference voltage and the voltage of the system output terminal. The first current mirror unit may be directly connected to the input terminal, supply the system current through the system output terminal to the system in response to the first signal, and output the proportional current to the sensing terminal.

The first controller may include a voltage divider and a first operational amplifier (OP-AMP). The voltage divider may be connected between the system output terminal and a ground voltage, and output a divided voltage in response to the voltage of the system output terminal. The first OP-AMP may have an inverting input terminal to which the reference voltage is applied and a non-inverting input terminal to which the divided voltage is applied. The first OP-AMP may output the first signal.

The first current mirror unit may include: a first PMOS transistor and a second PMOS transistor. The first PMOS transistor may be connected between the input terminal and the system output terminal and have a gate to which the first signal is applied, and supply the system current. The second PMOS transistor may be connected between the input terminal and the sensing terminal and have a gate to which the first signal is applied, and supply the proportional current.

The charging battery power supply may include: a second controller and a second current mirror unit. The second controller may maintain a voltage of the sensing terminal at a second voltage level in response to a current control voltage. The second controller may output a second signal in response to the current control voltage and the voltage of the sensing terminal. The second current mirror unit may be directly connected to the input terminal. The second current mirror unit may output a sensing current to the sensing terminal in response to the second signal and the proportional current and output the charging battery current to the charging battery output terminal in response to the second signal. The sensing current may decrease in proportion to the proportional current.

The second controller may include a second OP-AMP having an inverting input terminal to which the current control voltage is applied and a non-inverting input terminal to which the voltage of the sensing terminal is applied. The second OP-AMP may output the second signal.

The second current mirror unit may include: a third PMOS transistor and a fourth PMOS transistor. The third PMOS transistor may be connected between the input terminal and the sensing terminal and have a gate to which the second signal is applied, and supply the sensing current. The fourth PMOS transistor may be connected between the input terminal and the charging battery output terminal and have a gate to which the second signal is applied, and supply the charging battery current.

The power management circuit may further include a switch connected between the charging battery output terminal and the system output terminal. The switch may supply a current output from the charging battery to the system output terminal in response to the second signal.

A portable apparatus according to an exemplary embodiment of the inventive concept includes a system configured to execute at least one instruction, a charging battery, and a power management circuit. The power management circuit is configured to receive an external voltage and determine whether the external voltage is sufficient to power the system based on an amount of current consumed by the system. When the power management circuit determines that the external voltage is sufficient, the power management circuit is configured to provide a first current to the system based on the external voltage and a second current to the charging battery. When the power management circuit determines that the external voltage is insufficient, the power manage circuit is configured to provide a third current to the system based on the external voltage and a fourth current from the charging battery to the system.

The power management circuit may include a universal serial bus (USB) port to receive the external voltage. The power management circuit may further include a first PMOS transistor, a second PMOS transistor, a first operational amplifier (OP1), and a voltage divider. The first PMOS transistor may be connected between a first input terminal receiving the external voltage and a second input terminal of the system receiving the first current. The output of the OP1 may be connected to the gate of the first PMOS transistor. The voltage divider may be connected between the second input terminal and an input terminal of the OP1. The second PMOS transistor may be connected between the first input terminal and a sensing terminal, the gate of the second PMOS transistor receiving the output of the OP1. The power management circuit may determine the amount of power consumed by the system based on a sensing current output from the second PMOS transistor to the sensing terminal.

The power management circuit may further include a third PMOS transistor connected between the first input terminal and the sensing terminal, a second operational amplifier (OP2) whose output is connected to the gate of the third PMOS transistor, and a fourth PMOS transistor connected between the first input terminal and a battery terminal of the charging battery. The second PMOS transistor may be sized smaller than the first PMOS transistor and the third PMOS transistor may be sized smaller than the fourth PMOS transistor. The portable apparatus may further include a switch between the battery terminal and the second input terminal, where the switch is operated in response to the output of the OP2.

A power circuit according to an exemplary embodiment of the inventive concept is configured to supply and manage distribution of power to a system that executes instructions and a rechargeable battery configured to supply power to the system. The power circuit includes a power management circuit configured to receive an external voltage and determine whether the external voltage is sufficient to power the system based on an amount of current consumed by the system. The power management circuit provides a first current based on the external voltage to the system, and the amount is based on a second current that equals the first current divided by a factor greater than one. When the power management circuit determines that the external voltage is sufficient, the power management circuit is configured to provide the first current to the system and a third current to the rechargeable battery. The third current may decrease in proportion to the second current.

BRIEF DESCRIPTION OF THE DRAWINGS

Exemplary embodiments of the inventive concept are described in further detail below with reference to the accompanying drawings, in which.

DETAILED DESCRIPTION OF EXEMPLARY EMBODIMENTS

The inventive concept will now be described more fully with reference to the accompanying drawings in which exemplary embodiments thereof are shown. However, the inventive concept may be embodied in many alternate forms and should not be construed as limited to only the exemplary embodiments set forth herein.

Figure 1:
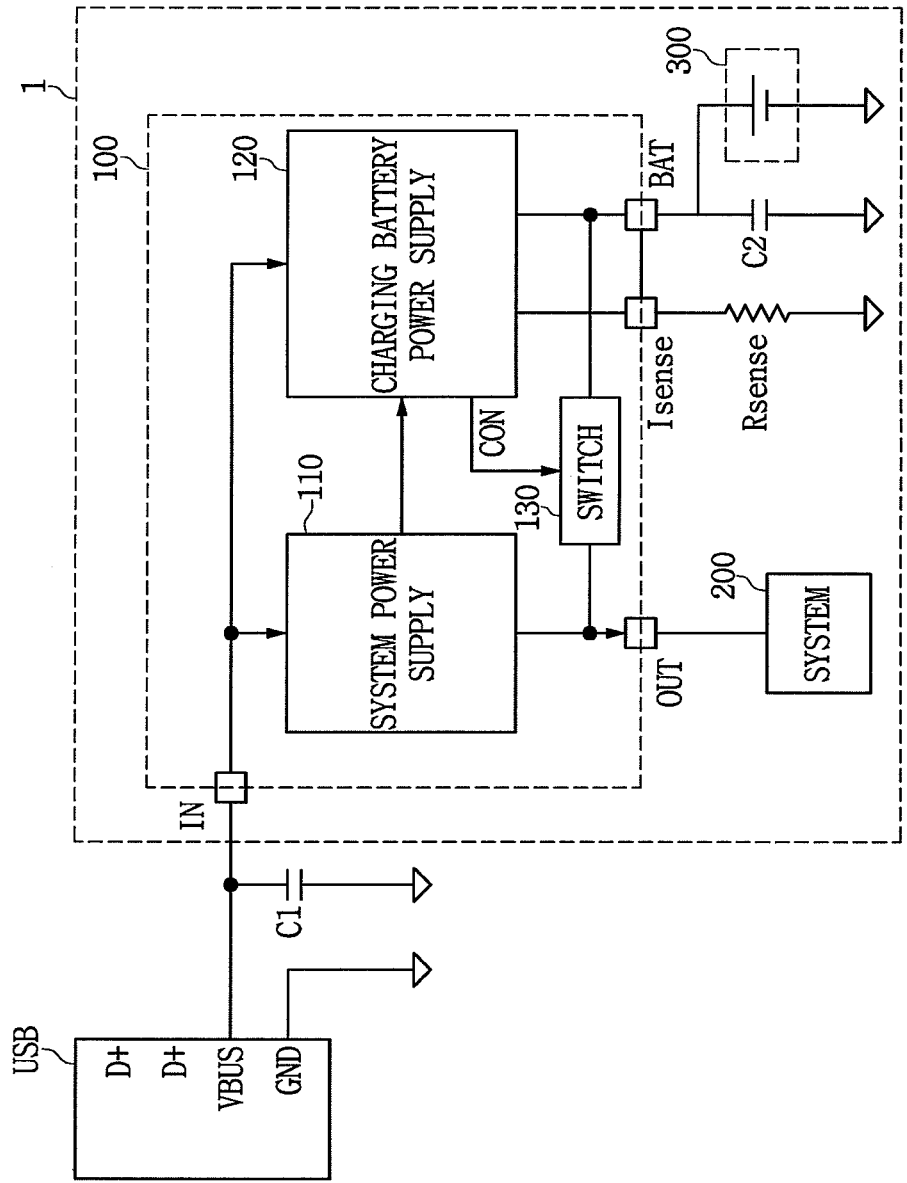
FIG. 1 illustrates a portable apparatus including a power management circuit according to an exemplary embodiment of the inventive concept.

FIG. 1 illustrates a portable apparatus 1 including a power management circuit 100 according to an exemplary embodiment of the inventive concept. The power management circuit 100 may be connected to a universal serial bus (USB) port USB. The portable apparatus 1 may further include a system 200 and a charging battery 300. The power management circuit 100 may include a system power supply 110, and a charging battery power supply 120. The power management circuit 100 may further include a switch 130. In FIG. 1, USB denotes a USB port, IN denotes an input terminal to which power is supplied through the USB port USB, OUT denotes a system output terminal connected to the system 200 to supply power to the system 200, Isense denotes a sensing terminal connected to a sensing resistor Rsense to sense the intensity of current supplied to the system 200, and BAT denotes a charging battery output terminal configured to supply power to the charging battery 300.

The USB port USB may include four terminals D+, D−, VBUS, and GND. The USB port USB may supply power to the portable apparatus 1 through the terminal VBUS. The terminals D+ and D− may be differential signal terminals. The USB port USB may transmit and receive data to and from a controller (not shown) of the portable apparatus 1 through the differential signal terminals D+ and D−.

The system 200 may receive power supplied from the power management circuit 100 and perform one or more functions. The functions may be based on the type of the portable apparatus 1. For example, the system 200 may execute functions or instructions that store data, output data, play an image, play a sound, etc. The system may include a processor for executing the instructions.

The charging battery 300 may be charged with a charging current supplied from the charging battery power supply 120 and supply power to the system 200 if required. For example, when the portable apparatus 1 is separated from the USB port USB or the system 200 requires more current than what can be supplied from the USB port USB, the charging battery 300 may supply power to the system 200.

The power management circuit 100 may receive power supplied through the terminal VBUS of the USB port USB, supply power to the system 200 and charge the charging battery 300 using the power. For example, the power management circuit 100 may supply power having a predetermined system current to the system 200, and supply the charging current to the charging battery 300 by sensing the level of the system current. The power management circuit 100 may supply power to the system 200 and charge the charging battery 300 at a same time.

The system power supply 110 may directly receive the power supplied through the terminal VBUS of the USB port USB and supply power having the predetermined system current to the system 200 of the portable apparatus 1. The system power supply 110 may output information on the current supplied to the system 200 to the charging battery power supply 120. For example, the system power supply 110 may be configured to output a proportional current to the charging battery power supply 120, which increases in proportion to the current supplied to the system 200.

The charging battery power supply 120 may directly receive power supplied through the terminal VBUS of the USB port USB and supply power having a predetermined current to the charging battery 300 of the portable apparatus 1 in response to the information output from the system power supply 110. For example, when the system power supply 110 outputs the proportional current to the charging battery power supply 120, which increases in proportion to the current supplied to the system 200, the charging battery power supply 120 may be configured to supply a charging battery current to the charging battery 300 of the portable apparatus 1, which decreases in proportion to the proportional current.

The charging battery power supply 120 may be further configured to output a control signal "con" to control the switch 130, in response to the information output from the system power supply 110. For example, assuming that the system power supply 110 outputs the proportional current to the charging battery power supply 120 as described above, when the proportional current reaches or exceeds a predetermined current threshold, the charging battery power supply 120 may be configured to output the control signal "con" to turn on the switch 130. The switch 130 may be turned on and off in response to the control signal "con" output by the charging battery power supply 120 and supply power having a predetermined current output from the charging battery 300 to the system 200.

Although FIG. 1 illustrates that the switch 130 is turned on and off in response to the control signal "con" output from the charging battery power supply 120, the power management circuit 100 of the portable apparatus 1 according to an exemplary embodiment may further include an additional controller (not shown) to control the switch 130.

Figure 2:
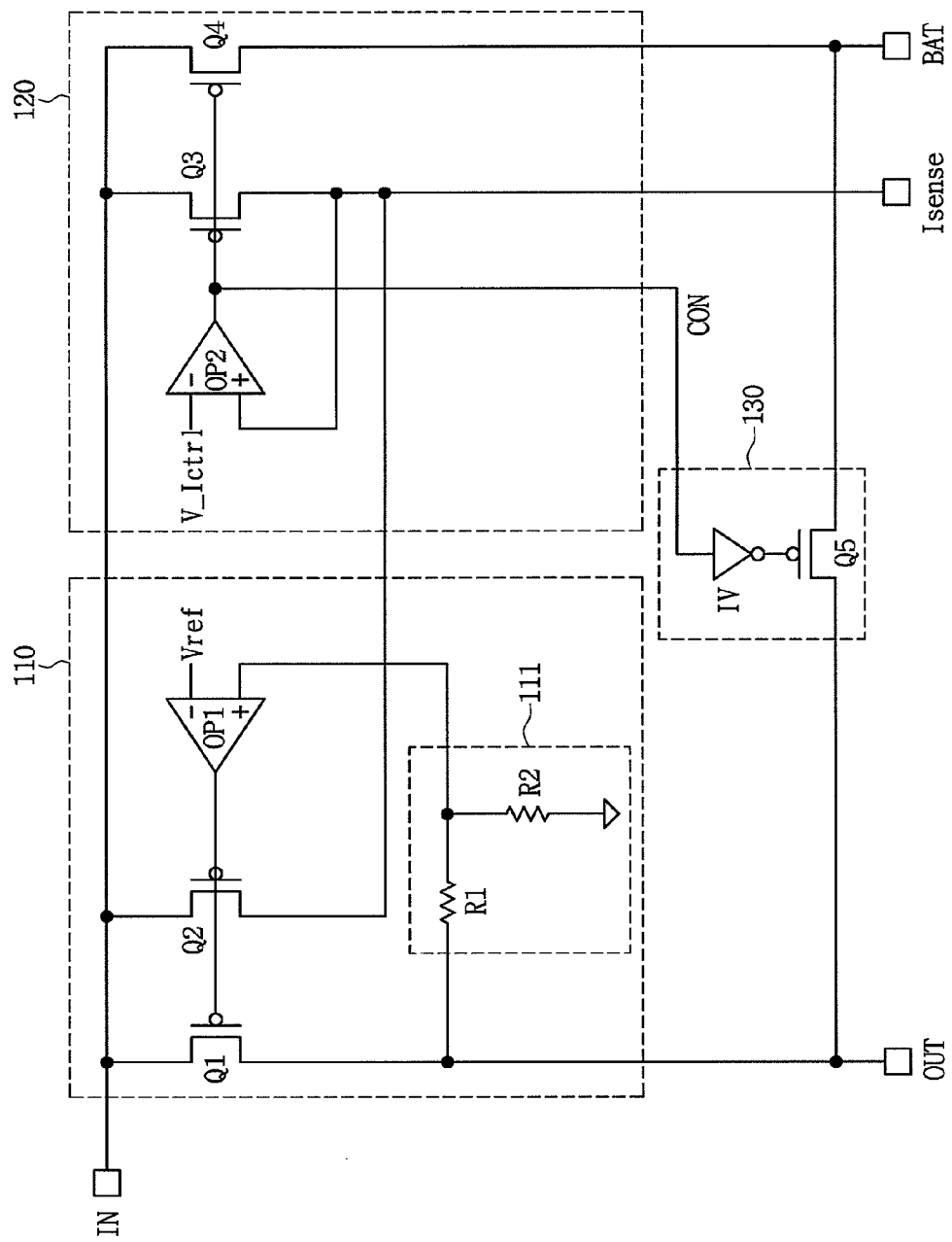
FIG. 2 illustrates the power management circuit of the portable apparatus of FIG. 1 according to an exemplary embodiment of the inventive concept.

FIG. 2 illustrates the power management circuit of the portable apparatus of FIG. 1 according to an exemplary embodiment of the inventive concept. Referring to FIG. 2, the power management circuit 100 may include the system power supply 110, the charging battery power supply 120, and the switch 130. The system power supply 110 may include two PMOS transistors Q1 and Q2, a first operational amplifier (OP-AMP) OP1, and a voltage divider 111. The voltage divider 111 may include resistors R1 and R2 connected between the system output terminal OUT and a ground voltage. The charging battery power supply 120 may include two PMOS transistors Q3 and Q4 and a second OP-AMP OP2. The switch 130 may include an inverter IV and a PMOS transistor Q5. In FIG. 2, IN, OUT, Isense, and BAT denote the same terminals as described above with reference to FIG. 1.

As discussed above, the system power supply 110 may include the first OP-AMP OP1 and the first and second PMOS transistors Q1 and Q2. The first OP-AMP OP1 may have an inverting input terminal to which the reference voltage Vref is applied and a non-inverting input terminal to which a divided voltage output from the voltage divider 111 is applied, and output an output signal. The first PMOS transistor Q1 may be connected between the input terminal IN and the system output terminal OUT and have a gate to which the output signal of the first OP-AMP OP1 is applied. The second PMOS transistor Q2 may be connected between the input terminal IN and the sensing terminal Isense and have a gate to which the output signal of the first OP-AMP OP1 is applied. The voltage divider 111 may be connected between the system output terminal OUT and the ground voltage.

An operation of the system power supply 110 will now be described according to an exemplary embodiment of the inventive concept. The first OP-AMP OP1 may supply the same voltage to the gates of the first and second PMOS transistors Q1 and Q2 to maintain the voltage of the system output terminal OUT at a constant level in response to the reference voltage Vref and the divided voltage. The voltage divider 111 may divide the voltage of the system output terminal OUT and output the divided voltage to the non-inverting input terminal "+" of the first OP-AMP OP1. The first PMOS transistor Q1 may transmit the power supplied through the input terminal IN to the system output terminal in response to the output signal of the first OP-AMP OP1. For example, the first OP-AMP OP1, the voltage divider 111, and the first PMOS transistor Q1 may form a feedback circuit, which may perform a feedback operation to maintain the voltage of the system output terminal OUT at a predetermined level of, for example, reference voltage Vref*(1+R1/R2). The reference voltage Vref may be set based on the system 200. For example, the reference voltage Vref may be set according to a voltage required for operation of the system 200.

The first PMOS transistor Q1 may directly receive power from the USB port USB through the input terminal IN and supply power having a predetermined system current through the system output terminal OUT to the system 200.

The second PMOS transistor Q2 may output a proportional current to the charging battery power supply 120, which increases in proportion to the current of the power supplied to the system 200. For example, the same voltage of the input terminal IN may be applied to sources of the first and second PMOS transistors Q1 and Q2, and the same output signal of the first OP-AMP OP 1 may be applied to the gates thereof. Thus, the first and second PMOS transistors Q1 and Q2 may operate as a current mirror so that a proportional current, which is proportional to current flowing through the first PMOS transistor Q1, may flow through the second PMOS transistor Q2. A ratio of current flowing through the second PMOS transistor Q2 to current flowing through the first PMOS transistor Q1 may depend on a ratio of the size of the second PMOS transistor Q2 to that of the first PMOS transistor Q1. The second PMOS transistor Q2 may be designed to have a smaller size than the first PMOS transistor Q1 such that the current flowing through the second PMOS transistor Q2 is 1/K times (K>>1 or K>1) as large as the current flowing through the first PMOS transistor Q1, where K may be a whole or a fractional number.

The proportional current flowing through the second PMOS transistor Q2 may be output to the charging battery power supply 120. The proportional current output to the charging battery power supply 120 may be output through the sensing terminal Isense.

As discussed above, the charging battery power supply 120 may include the second OP-AMP OP2, the third PMOS transistor Q3, and the fourth PMOS transistor Q4. The second OP-AMP OP2 may have an inverting input terminal to which a current control voltage V_Ictrl is applied and a non-inverting input terminal to which a voltage of the sensing terminal Isense is applied to, and output an output signal. The third PMOS transistor Q3 may be connected between the input terminal IN and the sensing terminal Isense and have a gate to which the output signal of the second OP-AMP OP2 is applied. The fourth PMOS transistor Q4 may be connected between the input terminal IN and the charging battery output terminal BAT and have a gate to which the output signal of the second OP-AMP OP2 is applied.

An operation of the charging battery power supply 120 will now be described according to an exemplary embodiment of the inventive concept. The second OP-AMP OP2 may output an output signal in response to a current control voltage V_Ictrl and a voltage of the sensing terminal Isense. The third PMOS transistor Q3 may transmit the power supplied through the input terminal IN in response to the output signal of the second OP-AMP OP2. Thus, the second OP-AMP OP2 and the third PMOS transistor Q3 may form a feedback circuit, which may perform a feedback operation such that the second OP-AMP OP2 sets the voltage of the sensing terminal Isense to a predetermined voltage, for example, the current control voltage V_Ictrl. The feedback operation may be performed only while the power management circuit 100 of the portable apparatus 1 is supplying power to the system 200 and charging the charging battery 300 at the same time.

As shown in FIG. 1, a predetermined sensing resistor Rsense may be connected to the sensing terminal Isense. The level of the current control voltage V_Ictrl may depend on the largest possible current supplied by the USB port USB. For example, when the system power supply 110 is configured such that the current flowing through the second PMOS transistor Q2 is 1/K times as large as the current flowing through the first PMOS transistor Q1, the current control voltage V_Ictrl may have a level of the largest possible current supplied by the USB port USB/K* resistance of the sensing resistor Rsense or slightly lower.

Further, when the power management circuit 100 of the portable apparatus 1 supplies power to the system 200 and charges the charging battery 300 at the same time, since the voltage of the sensing terminal Isense is maintained at a predetermined voltage level, the sensing resistor Rsense may function as a constant current source.

The fourth PMOS transistor Q4 may supply current through the charging battery output terminal BAT to the charging battery 300, which increases in proportion to the current supplied to the third PMOS transistor Q3. The same voltage of the input terminal IN may be applied to sources of the third and fourth PMOS transistors Q3 and Q4, while the same voltage of the second OP-AMP OP2 may be applied to gates thereof. Thus, the third and fourth PMOS transistors Q3 and Q4 may operate as a current mirror so that a charging battery current may flow through the fourth PMOS transistor Q4, which is proportional to a current flowing through the third PMOS transistor Q3. A ratio of current flowing through the fourth PMOS transistor Q4 to current flowing through the third PMOS transistor Q3 may depend on a ratio of the size of the fourth PMOS transistor Q4 to that of the third PMOS transistor Q3. The third PMOS transistor Q3 may be designed to have a smaller size than the fourth PMOS transistor Q4 such that the current flowing through the third PMOS transistor Q3 is 1/K times (K>>1 or K>1) as large as the current flowing through the fourth PMOS transistor Q4, where K may be a whole or a fractional number.

For example, when current consumed by the system 200 is 0, the current flowing through the first PMOS transistor Q1 may be 0 so that the current flowing through the second transistor Q2 may also be 0. Thus, the current flowing through the third PMOS transistor Q3 may be 1/K times as large as the largest possible current supplied by the USB port USB, so that the largest possible current supplied by the USB port USB may flow through the fourth PMOS transistor Q4. As a result, when the current consumed by the system 200 is 0, the charging battery 300 may be charged with the largest possible current supplied by the USB port USB.

When the current consumed by the system 200 increases, the current flowing through the second PMOS transistor Q2 may also increase. Since the voltage of the sensing terminal Isense is fixed, current flowing through the sensing resistor Rsense may also be fixed. Thus, when the current flowing through the second PMOS transistor Q2 increases, the current flowing through the third PMOS transistor Q3 may decrease, so that the current flowing through the fourth PMOS transistor Q4 (e.g., current with which the charging battery 300 is charged) may also decrease. Therefore, the power management circuit 100 of the portable apparatus 1 according to at least one exemplary embodiment of the inventive concept may vary current with which the charging battery 300 is charged, in response to the current consumed by the system 200, thereby stably supplying power to the system 200 and efficiently charging the charging battery 300 at the same time.

When the current consumed by the system 200 becomes at least as large as the largest possible current supplied by the USB port USB, that is, when the system 200 requires at least the largest possible current supplied by the USB port USB, the voltage of the sensing terminal Isense may become higher than the current control voltage V_Ictrl due to the current flowing through the second PMOS transistor Q2. As a result, since the second OP-AMP OP2 may output a high-level signal, the third and fourth PMOS transistors Q3 and Q4 may be turned off so that the charging battery 300 cannot be charged.

When the third and fourth PMOS transistors Q3 and Q4 are turned off, the fifth PMOS transistor Q5 of the switch 130 may be turned on in response to the output signal of the second OP-AMP OP2. Thus, any deficit in current required by the system 200 may be made up with current of the charging battery 300.

Although the power management circuit 100 of the portable apparatus 1 according to an exemplary embodiment of the inventive concept has been described as receiving power from the USB port USB, the power management circuit 100 may receive power from other paths or power sources than the USB port USB.

A power management circuit of a portable apparatus according to at least one exemplary embodiment can stably supply power to a system. Further, when the system stops operating or operates in a reduced mode to consume less current, the power management circuit can supply a larger amount of current to a charging battery. Further, even when the system requires a larger current than the largest possible current supplied by a power source, a power management circuit of a portable apparatus according to at least one embodiment of the inventive concept can enable the system to stably operate.

According to at least one embodiment of the inventive concept, a power management circuit of a portable apparatus can stably supply power to a system and simultaneously supply a larger current to a charging battery, thereby efficiently managing externally supplied power.

Having described exemplary embodiments of the inventive concept, it should be understood that the invention is not limited to the disclosed embodiments, but, on the contrary, is intended to cover various modifications and equivalent arrangements included within the spirit and scope of the disclosure.

What is claimed is:

1. A portable apparatus comprising:
a system configured to receive a system current and perform a function;
a charging battery configured to be charged with a charging battery current and supply power to the system; and
a power management circuit configured to receive an externally supplied power, supply the system current to the system, and supply the charging battery current to the charging battery based on a sensed level of the system current, wherein the charging battery current decreases in proportion to the system current, and
wherein the power management circuit comprises a first current mirror unit configured to output a proportional current used to determine the sensed level,
wherein the power management circuit further comprises:
a system power supply configured to directly receive the externally supplied power, supply the system current to the system, and output a proportional current that increases in proportion to the system current;
a charging battery power supply configured to directly receive the externally supplied power and supply the charging battery current to the charging battery, wherein the charging battery current decreases in proportion to the proportional current;
an input terminal to which the externally supplied power is applied;
a system output terminal connected to the system and through which the system current is output;
a sensing terminal connected to a sensing resistor and through which the proportional current is output; and
a charging battery output terminal connected to the charging battery and through which the charging battery current is output,
wherein the system power supply comprises:
a first controller configured to maintain a voltage of the system output terminal at a first voltage level in response to a reference voltage and output a first signal in response to the reference voltage and the voltage of the system output terminal; and
wherein the first current mirror unit is directly connected to the input terminal, and is configured to supply the system current through the system output terminal to the system in response to the first signal and output the proportional current to the sensing terminal.

2. The apparatus of claim 1, wherein the first controller comprises:
a voltage divider connected between the system output terminal and a ground voltage, and configured to output a divided voltage in response to the voltage of the system output terminal; and
a first operational amplifier (OP-AMP) having an inverting input terminal to which the reference voltage is applied and a non-inverting input terminal to which the divided voltage is applied, and configured to output the first signal.

3. The apparatus of claim 2, wherein the first current mirror unit comprises:
a first PMOS transistor connected between the input terminal and the system output terminal and having a gate to which the first signal is applied, and configured to supply the system current; and
a second PMOS transistor connected between the input terminal and the sensing terminal and having a gate to which the first signal is applied, and configured to supply the proportional current.

4. The apparatus of claim 1, wherein the charging battery power supply comprises:
a second controller configured to maintain a voltage of the sensing terminal at a second voltage level in response to a current control voltage and output a second signal in response to the current control voltage and the voltage of the sensing terminal; and
a second current mirror unit directly connected to the input terminal, and configured to output a sensing current to the sensing terminal in response to the second signal and the proportional current and output the charging battery current to the charging battery output terminal in response to the second signal, wherein the sensing current decreases in proportion to the proportional current.

5. The apparatus of claim 4, wherein the second controller comprises a second OP-AMP having an inverting input terminal to which the current control voltage is applied and a non-inverting input terminal to which the voltage of the sensing terminal is applied, and configured to output the second signal.

6. The apparatus of claim 5, wherein the second current mirror unit comprises:
a third PMOS transistor connected between the input terminal and the sensing terminal and having a gate to which the second signal is applied, and configured to supply the sensing current; and
a fourth PMOS transistor connected between the input terminal and the charging battery output terminal and having a gate to which the second signal is applied, and configured to supply the charging battery current.

7. The apparatus of claim 5, wherein the power management circuit further comprises a switch connected between the charging battery output terminal and the system output terminal and configured to supply a current output from the charging battery to the system output terminal in response to the second signal.

8. A portable apparatus comprising:
a system configured to execute at least one instruction;
a charging battery; and
a power management circuit configured to receive an external voltage and determine whether the external voltage is sufficient to power the system based on an amount of current consumed by the system,
wherein when the power management circuit determines that the external voltage is sufficient, the power management circuit is configured to provide a first current to the system based on the external voltage and a second current to the charging battery, and
wherein when the power management circuit determines that the external voltage is insufficient, the power manage circuit is configured to provide a third current to the system based on the external voltage and a fourth current from the charging battery to the system, and
wherein the power management circuit comprises a current mirror circuit having an output used to determine the sufficiency of the external voltage,
wherein the power management circuit further comprises:
a first PMOS transistor connected between a first input terminal receiving the external voltage and a second input terminal of the system receiving the first current;

a first operational amplifier (OP1), the output of the OP1 connected to the gate of the first PMOS transistor;

a voltage divider connected between the second input terminal and an input terminal of the OP1; and a second PMOS transistor connected between the first input terminal and a sensing terminal, the gate of the second PMOS transistor receiving the output of the OP1, wherein the power management circuit determines the amount of power consumed by the system based on a sensing current output from the second PMOS transistor to the sensing terminal.

9. The portable apparatus of claim 8, wherein the power management circuit further comprises:

a third PMOS transistor connected between the first input terminal and the sensing terminal;

a second operational amplifier (OP2), the output of the OP2 connected to the gate of the third PMOS transistor; and a fourth PMOS transistor connected between the first input terminal and a battery terminal of the charging battery.

10. The portable apparatus of claim 9, wherein the second PMOS transistor is sized smaller than the first PMOS transistor and the third PMOS transistor is sized smaller than the fourth PMOS transistor.

11. The portable apparatus of claim 10, further comprising a switch between the battery terminal and the second input terminal, the switch operated in response to the output of the OP2.

* * * * *